United States Patent
Akiyama

(10) Patent No.: US 7,356,335 B2
(45) Date of Patent: Apr. 8, 2008

(54) WIRELESS COMMUNICATION APPARATUS

(75) Inventor: Hiroyuki Akiyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 241 days.

(21) Appl. No.: 10/866,756

(22) Filed: Jun. 15, 2004

(65) Prior Publication Data

US 2005/0070270 A1   Mar. 31, 2005

(30) Foreign Application Priority Data

Sep. 30, 2003  (JP) .............................. 2003-340646

(51) Int. Cl.
  *H04Q 7/20*  (2006.01)
(52) U.S. Cl. ...................... 455/424; 370/343; 370/455; 370/449
(58) Field of Classification Search ............. 455/414.1, 455/502, 507, 424; 370/248, 389, 338, 348, 370/349, 414, 418, 350, 229, 445, 343, 455, 370/449; 375/145
See application file for complete search history.

(56) References Cited

U.S. PATENT DOCUMENTS

| | | | | |
|---|---|---|---|---|
| 5,206,881 | A * | 4/1993 | Messenger et al. ......... | 375/145 |
| 6,178,235 | B1 * | 1/2001 | Petersen et al. ............ | 379/134 |
| 2002/0071448 | A1 * | 6/2002 | Cervello et al. ............ | 370/445 |
| 2002/0089927 | A1 * | 7/2002 | Fischer et al. .............. | 370/229 |
| 2002/0115458 | A1 * | 8/2002 | Mizuno et al. ............. | 455/507 |
| 2002/0186660 | A1 * | 12/2002 | Bahadiroglu ................ | 370/248 |
| 2003/0012167 | A1 * | 1/2003 | Benveniste ................. | 370/338 |
| 2003/0053480 | A1 | 3/2003 | Jang et al. | |
| 2003/0174690 | A1 * | 9/2003 | Benveniste ................. | 370/350 |
| 2004/0077338 | A1 * | 4/2004 | Hsu et al. ................. | 455/414.1 |
| 2004/0179523 | A1 * | 9/2004 | Maruyama et al. ......... | 370/389 |
| 2005/0239474 | A9 * | 10/2005 | Liang ........................ | 455/454 |

FOREIGN PATENT DOCUMENTS

| | | |
|---|---|---|
| JP | 4-090230 A | 3/1992 |
| JP | 2002-300175 | 10/2002 |
| JP | 2003-179610 A | 6/2003 |

OTHER PUBLICATIONS

Notice of Reason for Rejection dated Mar. 7, 2006.

* cited by examiner

*Primary Examiner*—Jean Gelin
*Assistant Examiner*—Michael T Vu
(74) *Attorney, Agent, or Firm*—Nixon Peabody LLP; Donald R. Studebaker

(57) ABSTRACT

A wireless communication apparatus coordinates communication among a set of mobile stations by giving the mobile stations permission to transmit packets. The mobile stations divide comparatively long packets into shorter fragment packets. When the wireless communication apparatus receives a fragment packet with an indication that the station that transmitted the fragment packet has another fragment packet to transmit, the wireless communication apparatus gives the mobile station permission to transmit the next packet. The mobile station can accordingly transmit its fragment packets in continuous succession, avoiding a defragmentation timeout at the receiving end.

7 Claims, 10 Drawing Sheets

WIRELESS COMMUNICATION APPARATUS

BACKGROUND OF THE INVENTION

1. Field of the Invention

The present invention relates to wireless communication apparatus operating, for example, as an access point performing centralized control over a wireless communication area, more particularly to an apparatus with features that enable mobile stations to transmit fragment packets in a continuous series.

2. Description of the Related Art

Local area networks using wired transmission media have often employed the CSMA/CD (Carrier Sense Multiple Access with Collision Detection) communication protocol to enable a plurality of terminal devices to transmit packets on a shared medium. CSMA/CD has been standardized by the Institute of Electrical and Electronics Engineers (IEEE) as IEEE standard 802.3 for media access in wired communication equipment. To transmit a packet, terminal equipment implementing the CSMA function senses the usage status of the medium and transmits the desired packet after confirming that the medium has been idle for a certain length of time.

Wired communication equipment implementing the CD function continues to sense the medium even after transmitting a packet. If the transmitted packet collides with a packet transmitted from another source, the wired communication equipment detects the collision and transmits the same packet again after a random time interval referred to as a back-off interval. The random back-off interval reduces the probability of another collision between retransmitted packets. The methods used for sensing the carrier and detecting collisions depend on technology which is only feasible in a wired communication environment, however, so a different protocol is necessary in a wireless communication environment.

One protocol suitable for a wireless communication environment is CSMA/CA (Carrier Sense Multiple Access with Collision Avoidance). A version of CSMA/CA appears as a distributed coordination function (DCF) in IEEE standard 802.11, which concerns wireless local area networks. Wireless communication apparatus implementing the IEEE 802.11 distributed coordination function senses the medium before transmitting a packet, temporarily defers packet transmission if the medium is busy, waits for the medium to become idle, then waits for a further length of time equal to a fixed interval plus a random back-off interval, and transmits the packet if the medium remains idle during this further length of time. The fixed interval ensures a minimum spacing between transmitted packets; the random back-off interval reduces the probability of collisions between packets.

IEEE standard 802.11 also specifies a point coordination function (PCF) in which a single base station, referred to as an access point, controls communication among a set of mobile stations referred to as a basic service set (BSS). When the point coordination function is used, the access point has an independent right to transmit packets on the wireless communication medium to the stations in its BSS, but these stations cannot transmit packets without permission from the access point. Such permission is given a packet at a time in a process referred to as contention-free (CF) polling, by sending control information referred to as a CF-Poll.

When the access point has an outgoing packet of data to send to another station, it can transmit the packet and simultaneously poll the other station by setting CF-Poll information in the packet header. Alternatively, the access point can poll any station in the BSS by sending the station a packet including a CF-Poll with no packet body data. The access point maintains a list of CF-Pollable stations and polls these stations one at a time in their order on the list. The station that receives a CF-Poll from the access point can transmit the next packet after waiting for a comparatively short fixed interval, to which no random back-off interval is added.

The interval between packets transmitted under the point coordination function is accordingly shorter than the interval between packets transmitted under the distributed coordination function. This feature gives PCF transmission priority over DCF transmission. A CF-Poll, however, allows the polled station to transmit only one packet. A station cannot transmit a continuous series of packets unless it receives a continuous series of CF-Polls.

By having the access point control all packet transmission within a BSS, the point coordination function improves communication efficiency, as compared with the distributed coordination function, because all collisions between transmitted packets are avoided, and because the intervals between transmitted packets are shorter. Further information can be found in Japanese Unexamined Patent Application Publication No. 2002-300175, and in 'Wireless LAN Medium Access Control (MAC) and Physical Layer (PHY) Specifications', ANSI/IEEE Standard 802.11, 1999 Edition. Incidentally, the term 'packet' as used herein is synonymous with the term 'frame' used in the IEEE standard.

IEEE standard 802.11 also designates fragmentation and defragmentation functions. The fragmentation function divides a packet into a plurality of shorter fragment packets and transmits the fragment packets. The fragmentation function makes the retransmission of packets in which a bit error occurs during transmission more efficient, because only one fragment of the packet has to be retransmitted. The defragmentation function reassembles the fragment packets to reconstruct the original packet. Since it may not be possible to receive all of the fragment packets constituting the original packet, a defragmentation timeout limit (MaxReceiveLifetime) is set as a parameter of the defragmentation function. A timer at the receiving station is started at the reception of the first fragment packet. If the reconstruction of the original packet is not completed within the timeout limit, the receiving station discards the packet.

When the fragmentation and defragmentation functions are used with distributed coordination, a mobile station does not need to receive permission from the access point to transmit packets, so it can transmit a plurality of fragment packets in a continuous series. More accurately, the fragment packets and the answering acknowledgment packets from the receiving station alternate with one another in a continuous series. This capability is guaranteed by a provision in IEEE standard 802.11 that lets a station omit the random back-off interval after transmitting a fragment packet. Normally this allows all fragment packets to be received within the defragmentation timeout limit.

When the fragmentation and defragmentation functions are used with point coordination, however, a problem occurs. Because a mobile station receives permission to transmit only one fragment packet at a time, and because permission is granted according to a polling list, there is no guarantee that a station with fragment packets to transmit will be able to transmit the fragment packets in a continuous series. Normally, the station will not be able to do so, because the access point must poll all of the stations on its polling list before it can send a consecutive series of CF-Polls to any one station. A station that receives a fragment packet transmitted under PCF control may therefore have to wait for a considerable time before receiving the next fragment packet, making defragmentation timeout a significant problem during PCF periods.

SUMMARY OF THE INVENTION

An object of the present invention is to provide wireless transmission apparatus to which mobile stations can transmit fragment packets in a continuous series despite the use of a high-efficiency communication function such as a point coordination function.

The invented wireless transmission apparatus controls access to a wireless communication medium by a set of mobile stations. The apparatus includes an input communication unit for input of packets received from the mobile stations, an analyzer for analyzing information in the received packets, a packet generator for generating outgoing packets according to the results of the packet analysis, a timing controller for controlling the transmission timing of the outgoing packets, and a packet output unit for output of the outgoing packets at the designated transmission timing. The packet generator recognizes, from the packet analysis results, whether a mobile station that has transmitted a fragment packet has: another fragment packet to transmit, and if it does, generates an outgoing packet giving the mobile station permission to transmit the next packet on the wireless communication medium, with priority over other mobile stations.

In analyzing a received packet, the analyzer checks, for example, a bit in the packet header to determine whether the mobile station that transmitted the packet has an additional fragment packet to transmit.

The apparatus may also include an outgoing packet input unit for input of packet body data to be transmitted to a mobile station at a first address, and an address input unit for input of the first address. When the analyzer analyzes a received packet, it provides the packet generator with a second address, this being the address of the mobile station that transmitted the received packet. If the first address is identical to the second address, the packet generator generates an outgoing packet addressed to the second address, including permission to transmit the next packet and including the packet body data received from the outgoing packet input unit; if the first address differs from the second address, the packet generator generates an outgoing packet addressed to the second address, including permission to transmit the next packet but not including the packet body data received from the outgoing packet input unit.

The apparatus preferably also includes a polling request input unit for input of a polling request signal. When the analyzer decides, by analyzing the received packet, that the mobile station that transmitted the packet has no further fragment packet to transmit, if the outgoing packet input unit has received packet body data and the address input unit has received a first address, the packet generator generates an outgoing packet including the first address and the packet body data. If the polling request input unit receives a polling request signal at this time, the packet generator adds a polling indication to the outgoing packet, thereby giving the mobile station at the first address permission to transmit the next packet on the wireless medium.

Upon receiving a fragment packet including an indication that there is another fragment to follow, the invented wireless communication apparatus automatically gives the mobile station that transmitted the fragment packet permission to transmit the next packet. The invented wireless communication apparatus therefore allows a mobile station to transmit to another station a plurality of fragment packets in a consecutive series, even while a point coordination function or other high-efficiency communication function is in use. The mobile station that receives the fragment packets can receive them in a substantially continuous series, avoiding a defragmentation timeout.

DETAILED DESCRIPTION OF THE INVENTION

Figure 1:
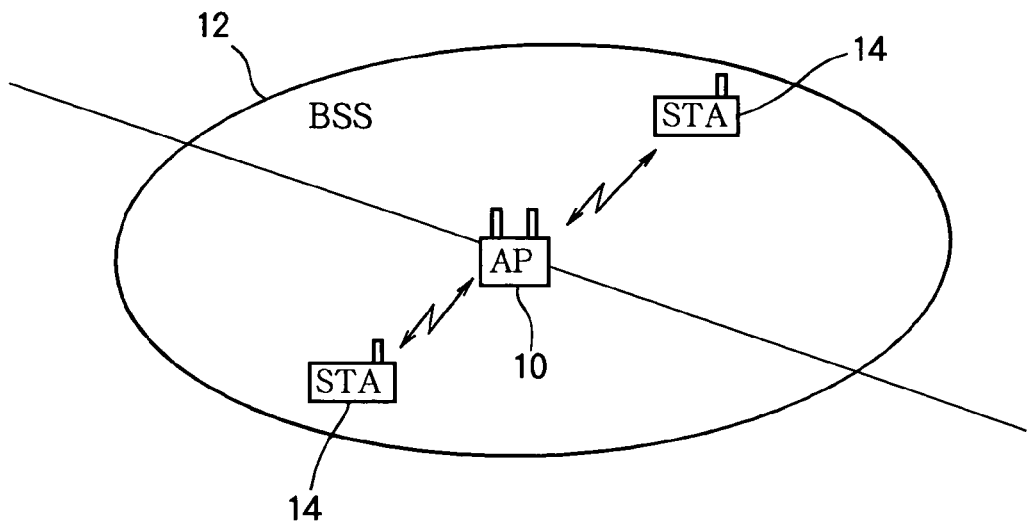
FIG. 1 illustrates communication in a basic service set.

A preferred embodiment of the invention will now be described with reference to the attached drawings, in which like elements are indicated by like reference characters. Reference characters of signal lines will also be used to denote the signals carried on the signal lines.

Referring to FIG. 1, the preferred embodiment is used in an access point (AP) 10 operating as a base station for a basic service set (BSS) 12 of mobile stations (STA) 14 that communicate with each other and with the outside world through the access point 10. After communication links have been established between the mobile stations 14 and the access point 10, the access point 10 and the mobile stations 14 constitute a piconet having an infrastructure network configuration.

Figure 2:
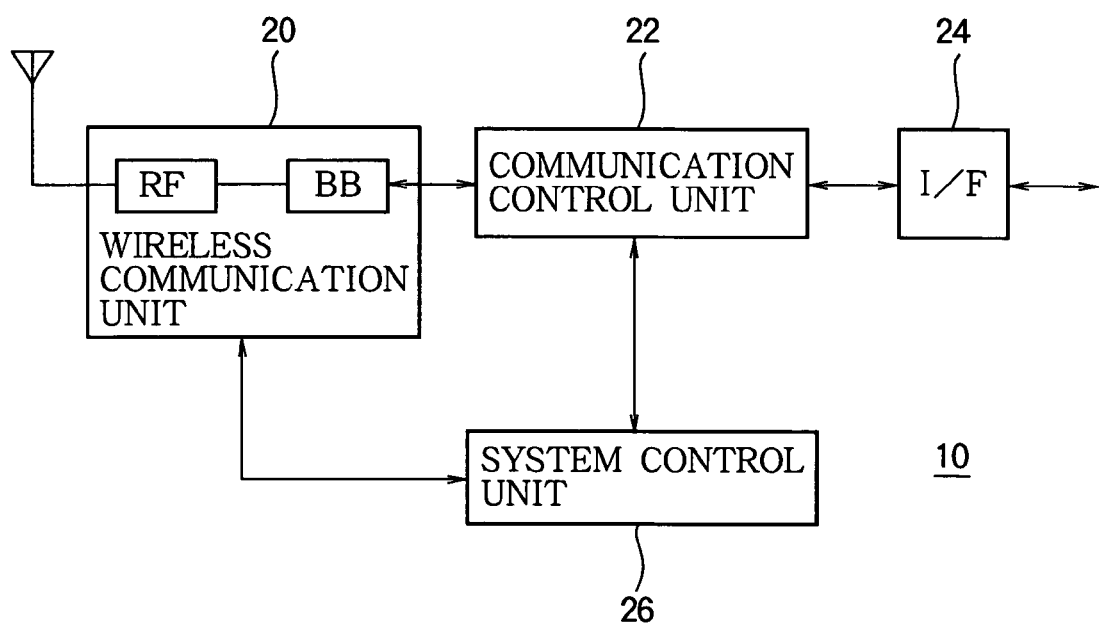
FIG. 2 is a block diagram showing an example of the structure of the access point in FIG. 1.

Referring to FIG. 2, the access point 10 has a wireless communication unit 20 that modulates and demodulates radio-frequency (RF) signals and performs baseband (BB) processing. The signals are transmitted and received by using a spread-spectrum communication system or an orthogonal frequency division multiplexing (OFDM) communication system. The access point 10 also has a communication control unit 22 that processes transmitted and received packets and controls the transmission and reception of data according to a communication protocol, an interface (I/F) unit 24 that connects the access point 10 to the Internet or another wired network, and a system control unit 26 that performs overall control of the access point 10.

Figure 3:
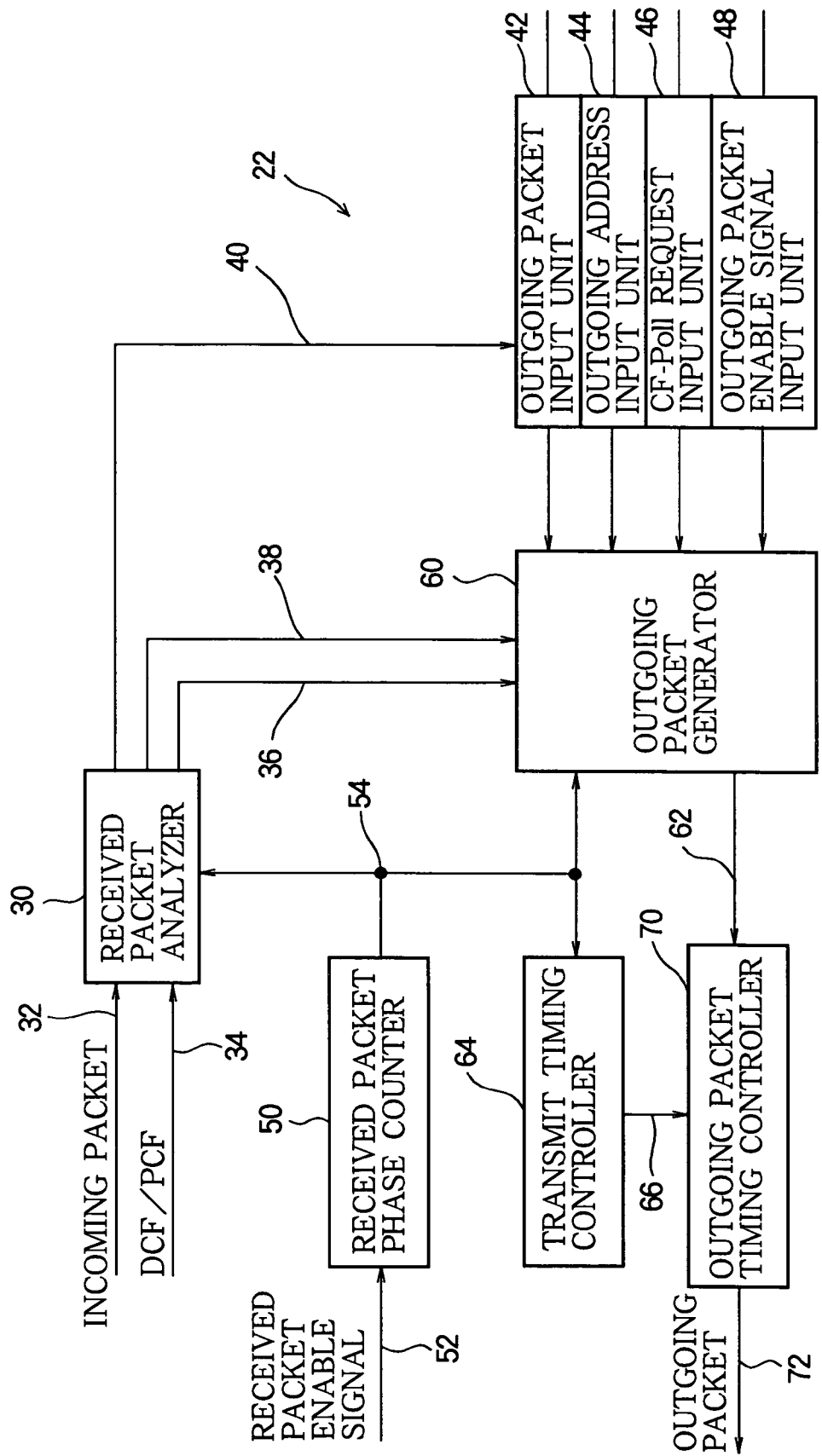
FIG. 3 is a block diagram showing an example of the internal structure of the communication controller in FIG. 2 according to the present invention.

An example of the internal structure of the communication control unit 22, which performs media access control processing, is shown in FIG. 3. The communication control unit 22 has a received packet analyzer 30, which analyzes received packets. The received packet analyzer 30 is a processor for analyzing the packet headers of packets conforming to IEEE standard 802.11, which are received on an input signal line 32. The received packet analyzer 30 also receives a DCF/PCF switching signal on another input signal line 34, and operates in either the DCF mode or the PCF mode according to this switching signal. When the DCF/PCF switching signal indicates the PCF mode, the received packet analyzer 30 determines whether the station from which the current packet was received has another fragment packet to transmit by checking a More Fragments bit in the header of the received packet, outputs a More Fragments bit detection result signal on an output signal line 36, and outputs an address signal on another output signal line 38, indicating the source address of the packet, that is, the address of the station from which the packet was received.

Figure 4:
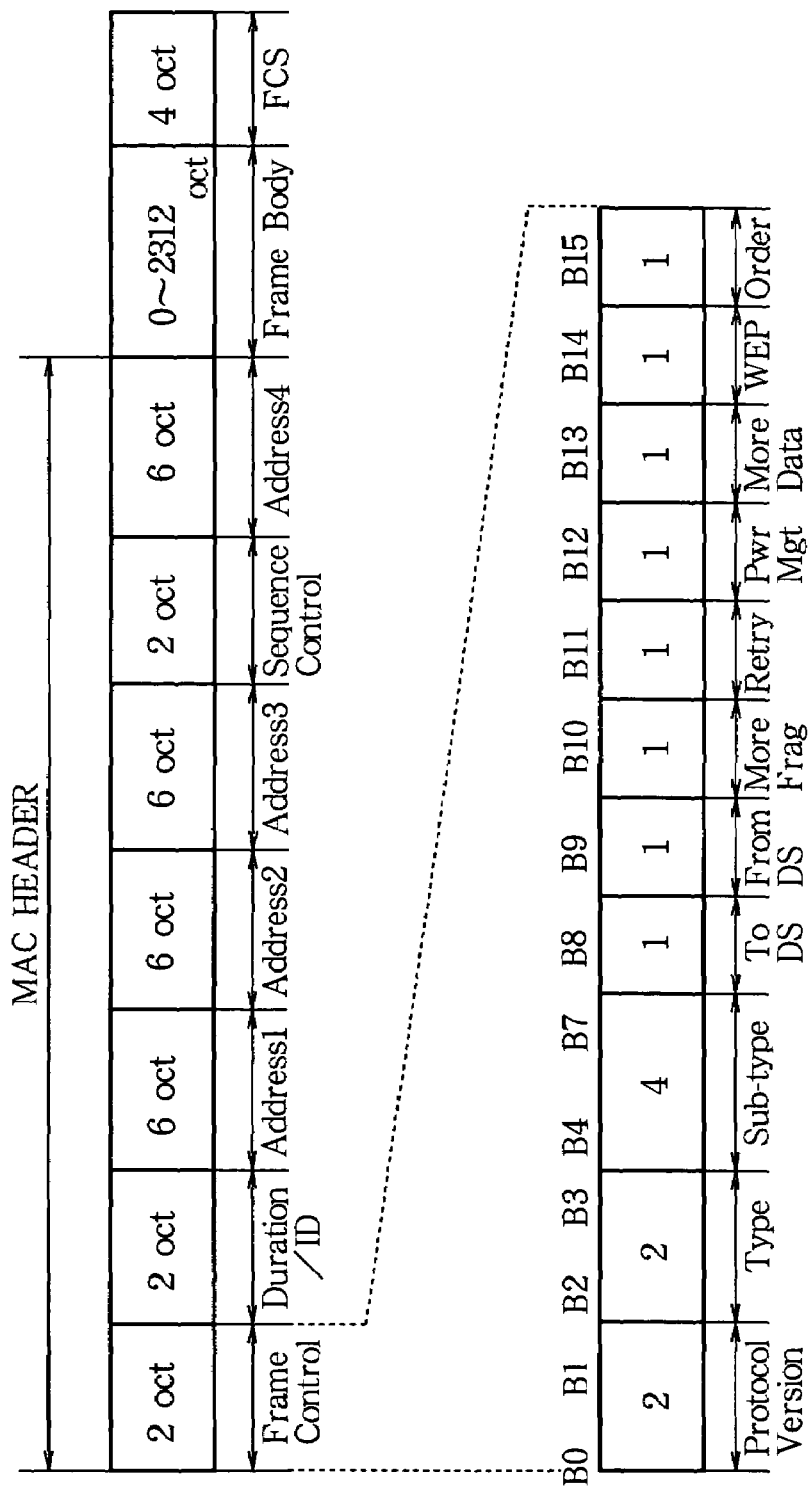
FIG. 4 illustrates the structure of a packet with a header conforming to the IEEE standard 802.11.

The packet structure specified in IEEE standard 802.11 is shown in FIG. 4. The packet consists of a media access control (MAC) header, a frame body, and a frame check sequence (FCS). The More Fragments (More Frag) bit is the eleventh bit (bit B10) in the two-octet (2 oct) frame control field of the MAC header. The More Fragments bit is set to '1' to indicate the existence of another fragment packet following the present packet. Bits B2-B7 in the frame control field are a type and sub-type designation indicating, among other things, whether the station 14 that receives the packet has permission to transmit the next packet (CF-Poll). When this permission is given, the station 14 may transmit any packet that it holds, not necessarily a fragment packet.

The received packet analyzer 30 also determines, from the packet header, whether the received packet should be transmitted to another station. If the received packet is to be transmitted to another station, the received packet analyzer 30 outputs the received packet on an output signal line 40 which is connected to an outgoing packet input unit 42 as shown in FIG. 3.

A received packet phase counter 50 receives a received packet enable signal, which indicates the temporal position or 'phase' of the received packet, on an input signal line 52, and counts in synchronization with the phase of the received packet to obtain a phase count value, which is output on an output signal line 54. This output signal line 54 is connected to the received packet analyzer 30, an outgoing packet generator 60, and a transmit timing controller 64. The received packet analyzer 30 recognizes the locations of the More Fragments bit and source address in the received packet according to the phase count value output from the received packet phase counter 50.

The outgoing packet generator 60 is connected to the outgoing packet input unit 42 for input of packet body data to be transmitted, an outgoing address input unit 44 for input of the destination address of the packet body data, a CF-Poll request input unit 46 for input of a CF-Poll request signal indicating whether to add permission to transmit the next packet (CF-Poll) to a packet when the packet is transmitted to the wireless communication medium, and an outgoing packet enable signal input unit 48 for input of an outgoing packet enable signal. These signals are generated externally. From these signals, together with the More Fragments bit detection result signal 36 and address signal 38 output from the received packet analyzer 30 and the phase count value 54, the outgoing packet generator 60 generates a packet conforming to IEEE standard 802.11, and outputs the generated packet on an output signal line 62.

Figure 7:
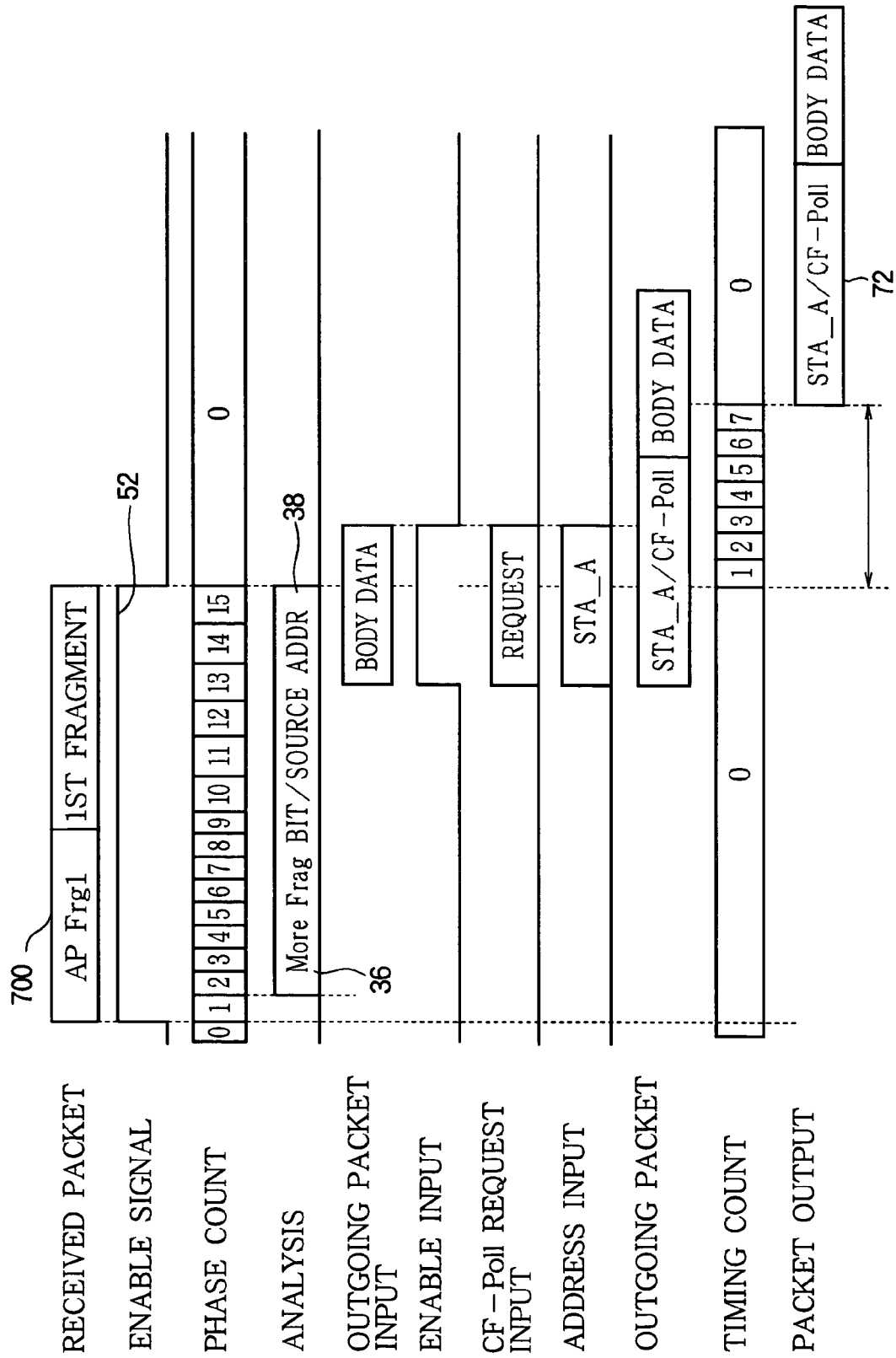
FIGS. 7 and 8 illustrate transmission control by the access point.
Figure 8:
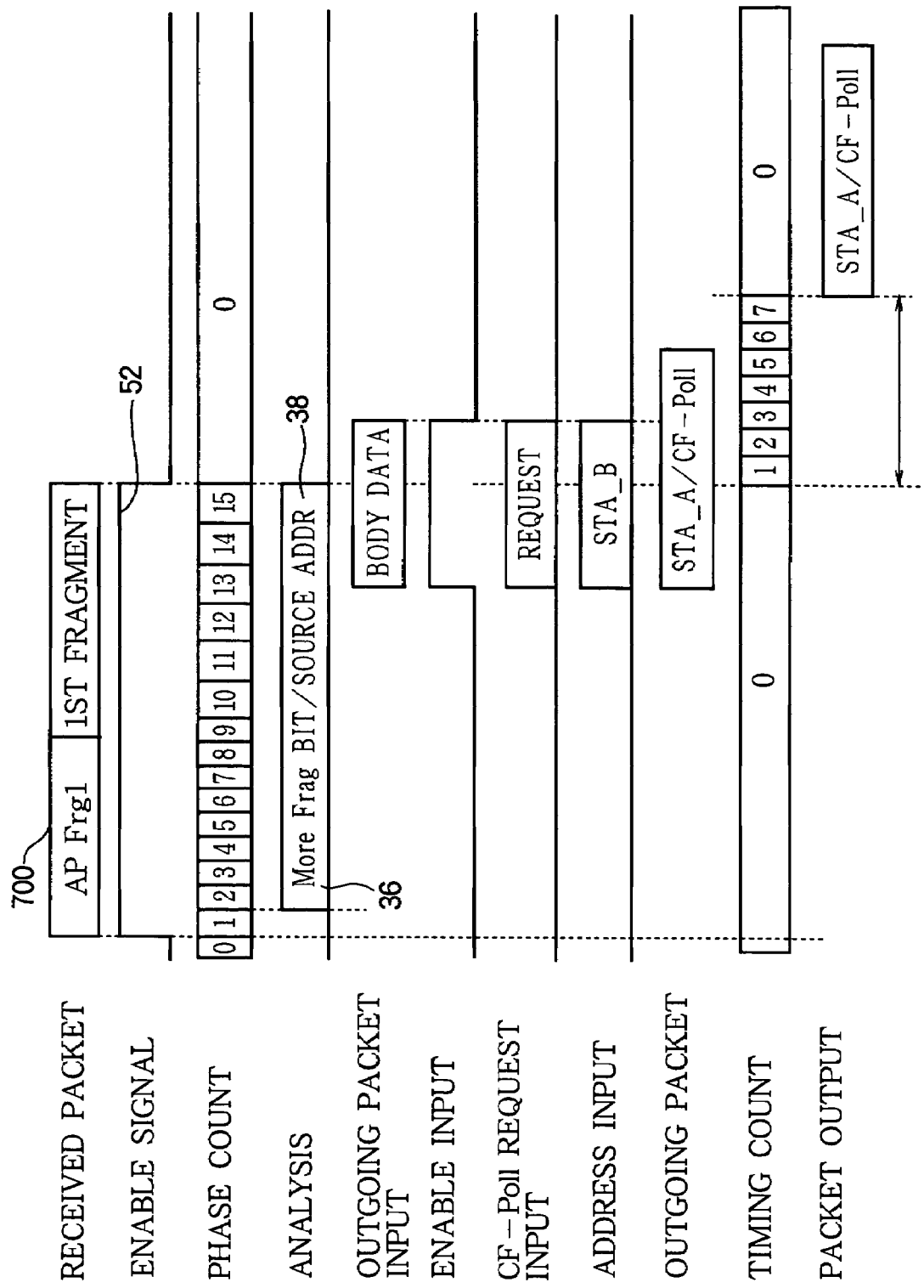

The transmit timing controller 64 receives the phase count value 54 from the received packet phase counter 50, and counts out the transmission timing of the packet on an output signal line 66. The transmit timing controller 64 starts counting after the phase count value 54 has reached '15', at the time of completion of input of the received packet. In the present embodiment, the transmit timing controller 64 signals the transmission timing by counting up to '7' as shown in FIGS. 7 and 8. An outgoing packet timing controller 70 connected to the transmit timing signal line 66 receives the outgoing packet generated in the outgoing packet generator 60 on signal line 62, and outputs the outgoing packet on an output signal line 72 at the transmission timing phase signaled by the transmit timing controller 64.

Figure 5:
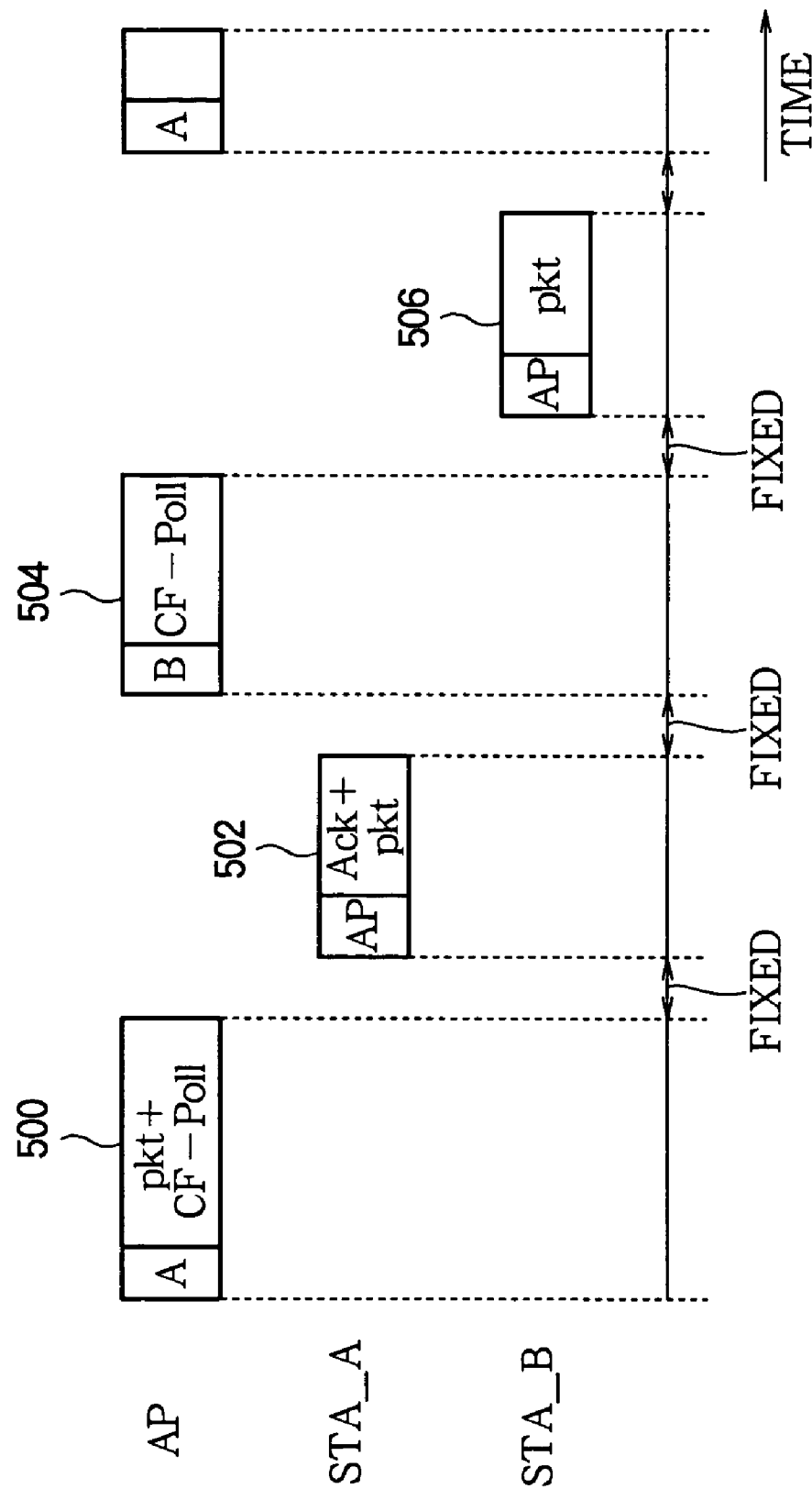
FIG. 5 illustrates packet transmission during a PCF period.

An example of normal packet transmission control with point coordination performed by the communication control unit 22 will be described with reference to FIG. 5. An outgoing packet 500 addressed to station A (STA_A), including packet body data (pkt) and permission to transmit the next packet (CF-Poll), is transmitted from the access point 10 and received by station A. After receiving the outgoing packet 500, station A waits for a fixed interval, then transmits a packet 502 including the address (AP) of the access point 10, an acknowledgement (ACK), and packet body data (pkt). The access point 10 may now poll another station B (STA_B) by transmitting a packet 504 addressed to station B, including permission to transmit the next packet (CF-Poll). Station B receives the CF-Poll packet 504, and after a fixed interval, transmits a packet 506 including the address (AP) of the access point and packet body data (pkt).

Figure 6:
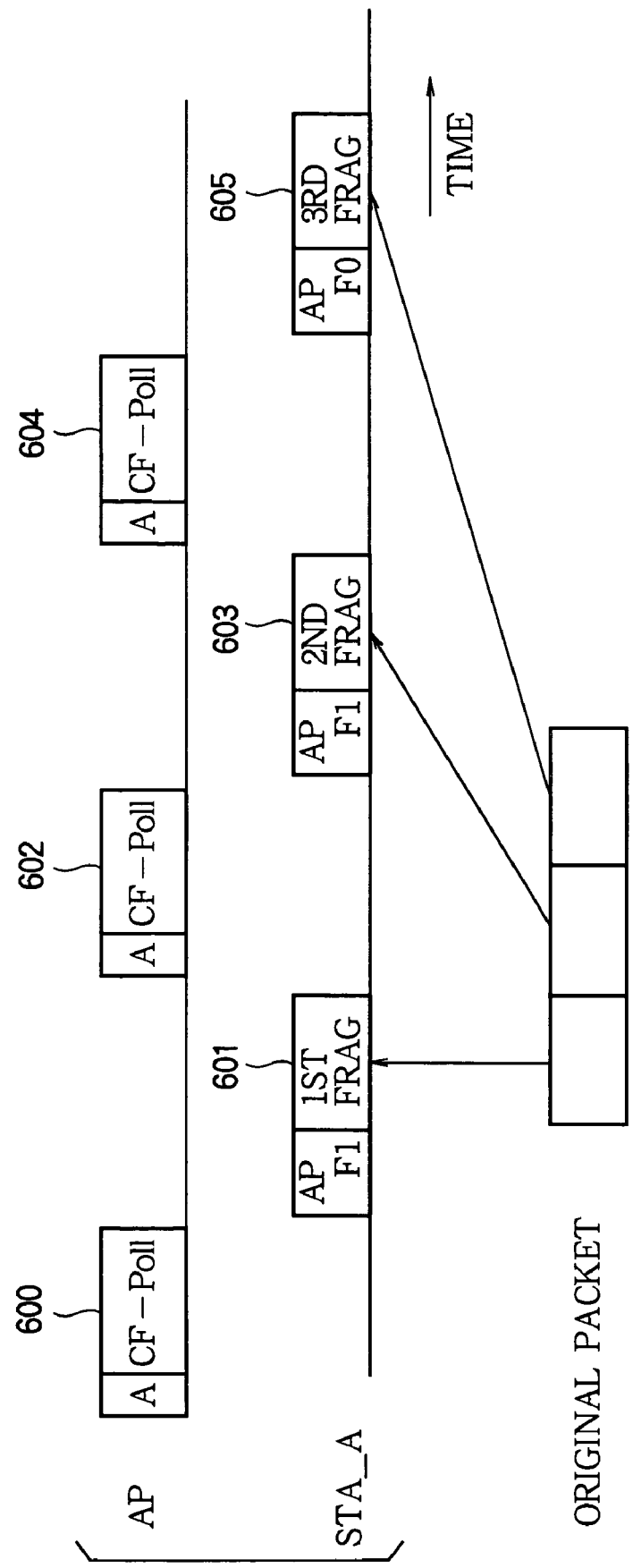
FIG. 6 illustrates fragment packet transmission during a PCF period.

Fragment packet transmission under point coordination control will be described with reference to FIG. 6. In this drawing a packet transmitted from station A (STA_A) to the access point 10 is divided into three fragment packets. When the access point polls station A by sending it a packet 600 including permission to transmit the next packet (CF-Poll), station A assembles a packet 601 including the address AP of the access point and the first fragment (1st FRAG) of the original packet, sets the More Fragments bit in the assembled packet to '1' (F1), and transmits the assembled packet 601. The access point 10 recognizes that the More Fragments bit is set to '1' (F1) and polls station A again by transmitting a packet 602 to station A, once more giving permission to transmit the next packet (CF-Poll). Station A receives this second polling packet 602, assembles another packet 603 with the More Fragments bit set to '1' (F1), including the address of the access point and the second fragment of the original packet, and transmits the assembled packet 603. When the access point 10 recognizes that the More Fragments bit is set to '1' (F1) in this packet 603, it transmits another CF-Poll packet 604 addressed to station A, giving station A permission to transmit the next packet again. Station A assembles a packet 605 including the address of the access point and the third fragment of the original packet, with the More Fragments bit set to '0' (F0) to indicate that there are no remaining fragment packets, and transmits the assembled packet 605.

As described above, the present invention enables a mobile station 14 to transmit fragment packets continuously to the access point 10, even during a PCF period. During PCF control, the access point 10 analyzes each packet received from the station 14, recognizes from the More Fragments bit whether there is another fragment packet, and if there is, gives the station 14 permission to transmit the next packet. Continuing in like manner, the access point sends the same station a continuous series of CF-Poll packets as long as it continues to receive packets with the More Fragments bit set to '1'.

Transmission control by the access point 10 will now be described in more detail with reference to FIG. 7. It is assumed that the DCF/PCF switching signal 34 input to the received packet analyzer 30 as shown in FIG. 3 has selected the PCF mode and the received packet analyzer 30 has been activated. A packet 700 is transmitted from station A (STA_A) 14, received at the access point 10, and input to the received packet analyzer 30. The header of received packet 700 includes the address (AP) of the access point 10 and a More Fragments bit set to '1' (Frg1); the header is followed by the first fragment of the original packet.

A received packet enable signal 52 indicating the phase of received packet 700 is input to the received packet phase counter 50. Triggered by the received packet enable signal, the received packet phase counter 50 starts counting synchronously from '1' to '15' during the input of the received packet enable signal 52. The received packet analyzer 30 outputs the results of its analysis of the received packet header on its output signal lines 36 and 38 at the timing of phase count '2'. The analysis results show that the More Fragments bit is set to '1', indicating the existence of another fragment packet at station A, and that the source address (ADDR) is the address of station A. These results are sent to the outgoing packet generator 60, which recognizes the information in them.

The outgoing packet generator 60 also receives the packet body data of next packet to transmit, which is input to the outgoing packet input unit 42, the outgoing packet enable signal input to the outgoing packet enable signal input unit 48, the CF-Poll request signal input to the CF-Poll request input unit 46, and the destination address input to the outgoing address input unit 44. The destination address is the address of the station (STA_A) that transmitted the received packet 700.

The outgoing packet generator 60 assembles a packet with a header including CF-Poll information and including the address of station A as its destination address, followed by the packet body data received from the outgoing packet input unit 42, which is destined for the same station A. The assembled packet is output to the outgoing packet timing controller 70, where it is temporarily held.

The end of input of the received packet enable signal causes the transmit timing controller 64 to start its transmission timing counter (not shown in the drawings). After a fixed interval in which the transmission timing counter counts from '1' to '7', the outgoing packet timing controller 70 outputs the outgoing packet that it holds on the output signal line 72. The packet includes CF-Poll information by which the access point 10 gives station A the right of access to the wireless communication medium.

If the outgoing address input unit 44 designates the address of station B, which differs from the source station (station A) of the packet received at this time, the outgoing packet generator 60 assembles a CF-Poll packet addressed to station A, without adding the outgoing packet input to the outgoing packet input unit 42, which is addressed to station B, and outputs the assembled packet to the outgoing packet timing controller 70, as shown in FIG. 8. As a result, the packet is transmitted with a header including CF-Poll information and the address of station A as its destination address, but with no packet body data.

Figure 9:
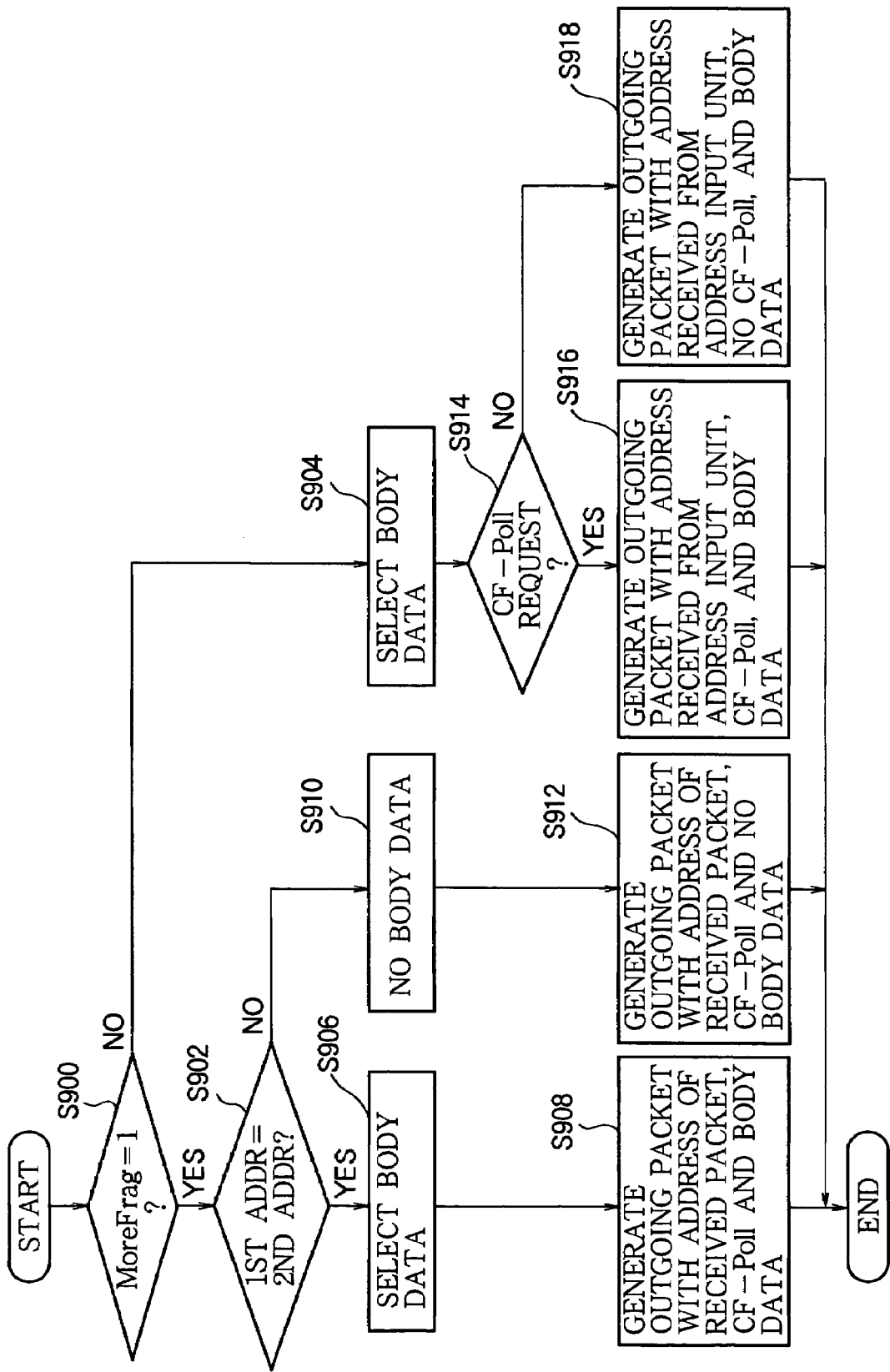
FIG. 9 is a flowchart showing decisions and operations carried out in the outgoing packet generation processing unit in FIG. 3 during the control sequences in FIGS. 7 and 8.

The decisions and operations carried out in the outgoing packet generator 60 will be described with reference to the flowchart in FIG. 9. These operations start at a timing determined by the phase count 54 (in FIG. 3).

In step S900, the outgoing packet generator 60 decides whether the More Fragments bit in the received packet is set to '1'. If the More Fragments bit is set to '1', the process goes to step S902; if the More Fragments bit is set to '0', the process goes to step S904.

If the More Fragments bit is set to '1', then in steps S902, S906, S908, S910, and S912, the access point 10 performs operations to transmit another CF-Poll packet, so that the station 14 which has transmitted the received packet can transmit the next fragment packet without delay; if the More Fragments bit is set to '0', then in steps S904, S914, S916, and S918, a process is performed for generating an outgoing packet from information received from the outgoing packet input unit 42, the outgoing address input unit 44, and the CF-Poll request input unit 46.

In step S902, the address 38 of the source station of the received packet is compared with the address obtained from the outgoing address input unit 44. If the two addresses are identical, the process goes to step S906, and the packet body data input to the outgoing packet input unit 42 is selected and received by the outgoing packet generator 60.

In step S908, an outgoing packet is generated with packet body data received from the outgoing packet input unit 42, and with a header including the source address 38 obtained by analysis of the input packet. The packet header also includes CF-Poll information. FIG. 7 shows a packet including data addressed to station A (STA_A) being generated and output in this way.

If it is found in step S902 that the source address of the received packet differs from the address from the outgoing address input unit 44, then in step S910, which selects the next packet to transmit, no packet body data is included and the process goes to step S912. In step S912, the outgoing packet generator 60 generates an outgoing packet with a header including the recognized address 38 of the source station of the received packet and a CF-Poll, but with no packet body data. FIG. 8 shows a packet without packet body data, addressed to station A (STA_A), being generated and output in this way.

If it is found in step S900 that the More Fragments bit is set to '0', then in step S904, the outgoing packet generator 60 selects the packet body data from the outgoing packet input unit 42 as the next packet to transmit. In step S914, another decision is made on the signal received from the CF-Poll request input unit 46. If a CF-Poll request signal is input, the process goes to step S916; if a CF-Poll request signal is not input, the process goes to step S918.

In step S916, the outgoing packet generator 60 generates an outgoing packet with a header including the address received from the outgoing address input unit 44 and a CF-Poll, and with packet body data received from the outgoing packet input unit 42.

If it is found in step S914 that a CF-Poll request is not received from the CF-Poll request input unit 46, then in step S918, the outgoing packet generator 60 generates an outgoing packet with a header including the address received from the outgoing address input unit 44, but not including a CF-Poll, and with packet body data received from the outgoing packet input unit 42.

The outgoing packet generated in the outgoing packet generator 60 as described above is temporarily held in the outgoing packet timing controller 70, and output on the output signal line 72 when the transmit timing controller 64 provides a transmission-timing signal at a fixed timing. After the outgoing packet is sent from the communication control unit 22 to the wireless communication unit 20, baseband processing is performed, the outgoing packet is modulated onto a spread spectrum signal channel, and the modulated signal is transmitted from an antenna.

Figure 10:
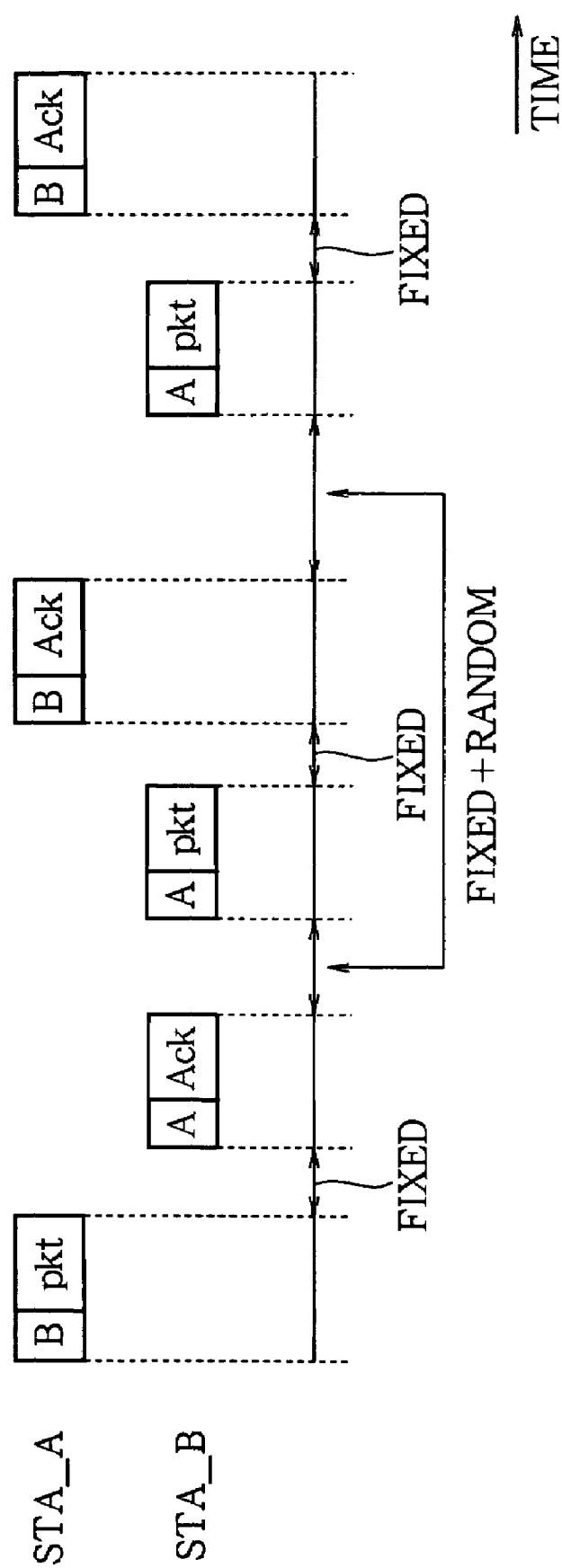
FIG. 10 illustrates packet transmission during a DCF period.
Figure 11:
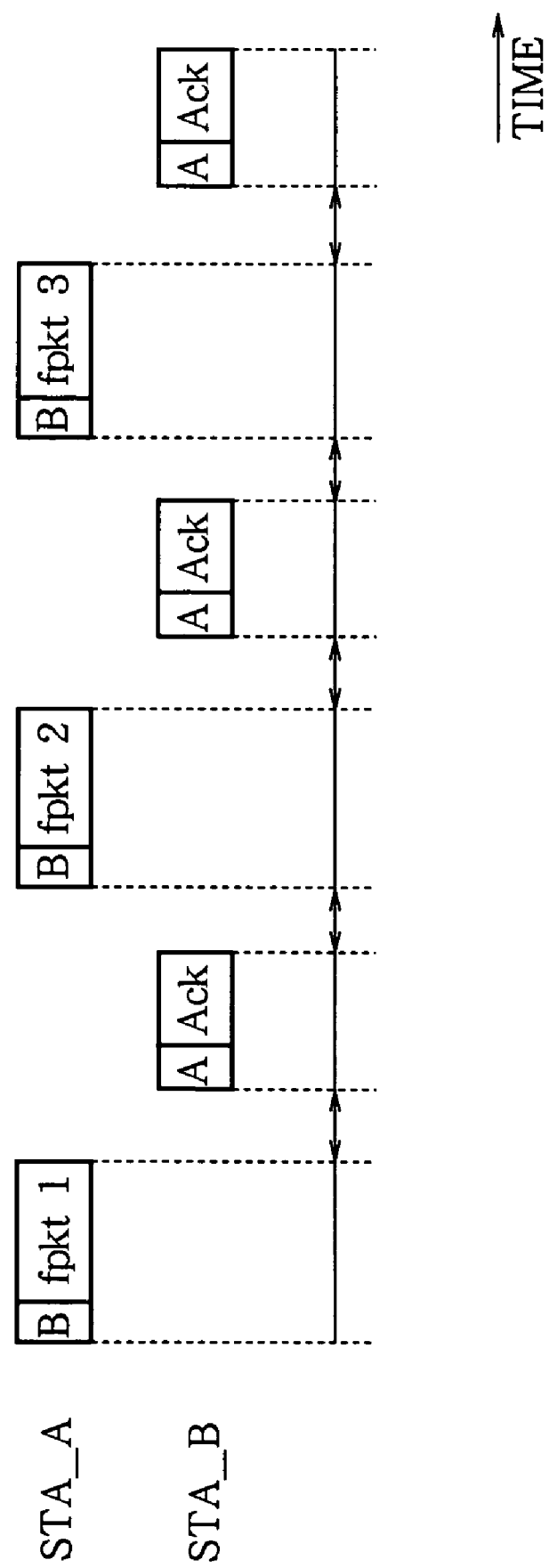
FIG. 11 illustrates fragment packet transmission during a DCF period.

FIG. 10 illustrates conventional packet transmission control when two stations in the same BSS 12 communicate with each other directly, using the distributed coordination function on an ad hoc network basis, instead of communicating through the access point 10. The two stations are designated station A (STA_A) and station B (STA_B). FIG. 11 illustrates a similar communication sequence with fragment packets.

Referring to FIG. 10, during a DCF period as specified in IEEE standard 802.11, each packet transmission is followed by the return of an acknowledging (ACK) packet. The ACK packet is separated by a fixed idle interval from the packet it acknowledges. The next packet to be transmitted is separated from the ACK packet transmission by a variable interval in which a random back-off interval is added to the fixed interval. This random interval limits the efficiency of communication by the DCF function.

Referring to FIG. 11, during the DCF period, fragment packets can be transmitted and received without the random back-off interval, but only when the stations 14 communicate with each other directly. Accordingly, a BSS environment in which the stations 14 can communicate with each other directly is required; the stations 14 cannot pass fragment packets through the access point 10.

The conventional PCF function does not give a station 14 the guaranteed control over the access point 10 needed to transmit fragment packets to the access point 10 continuously. Therefore, a defragmentation timeout may occur at the receiving station. The invented wireless transmission apparatus, however, enables a station 14 to transmit fragment packets continuously and reliably through the access point 10 by decisions and packet generation carried out in the outgoing packet generator 60.

In the wireless transmission apparatus described above, the invention is applied to an access point implementing the point coordination function specified in IEEE standard 802.11 to control media access, but the invention is not limited to this type of access point. The invention can also be applied, for example to a quality-of-service (QoS) enhanced access point (QAP) having the hybrid coordination function (HCF) specified in IEEE standard 802.11e.

Those skilled in the art will recognize that further variations are possible within the scope of the invention, which is defined in the appended claims.

What is claimed is:

1. A wireless communication apparatus having a point coordination function for performing centralized control over access to a wireless medium used by a basic service set of mobile stations by giving the mobile stations permission to transmit packets, the mobile stations divide packets into fragment packets and transmit all but the last of the fragment packets with a more fragments indication indicating that there are more fragment packets to be transmitted, comprising:

an input communication unit for input of packets received from the mobile stations;
an outgoing packet input unit for receiving packet body data to be transmitted;
an outgoing address input unit for receiving a first address designating a first one of the mobile stations to which the packet body data are to be transmitted;
an analyzer for analyzing information in the received packets to determine at least whether the mobile stations that transmitted the packet have more packets to transmit by checking the more fragments indication, and outputting analysis results, and the analyzer outputs a second address indicating a second one of the mobile stations, from which the received packet was received,
a packet generator for generating outgoing packets according to the analysis results, the packet generator including said second address in the contention-free polling packet, whereby the polling packet is sent to the second one of the mobile stations;
a timing controller for controlling the transmission timing of the outgoing packets; and
a packet output unit for output of the outgoing packets at the designated transmission timing;
wherein if one of the mobile stations transmits a packet with an indication that it has another packet to transmit, the packet generator generates a contention-free polling packet addressed to said one of the mobile stations, the contention-free polling packet giving said one of the mobile stations permission to transmit a next packet, and the packet output unit outputs the contention-free polling packet as one of the outgoing packets, before polling another one of the mobile stations.

2. The wireless communication apparatus of claim 1 wherein the more fragments indication comprises a bit in a packet header.

3. The wireless communication apparatus of claim 1, wherein:
the packet generator compares the first address with the second address; and
if the first address and the second address are identical, the packet generator includes said packet body data in the contention-free polling packet.

4. The wireless communication apparatus of claim 1, wherein the packet generator omits said packet body data from the contention-free polling packet if the first address does not match the second address.

5. The wireless communication apparatus of claim 1, wherein if the outgoing packet input unit receives said packet body data when the input communication unit receives a packet from one of the mobile stations and the analyzer determines that said one of the mobile stations does not have another packet to transmit, the packet generator generates a packet including the first address and said packet body data.

6. The wireless communication apparatus of claim 4, further comprising a polling request input unit for input of a polling request signal, wherein if the polling request input unit receives said polling request signal and the outgoing packet input unit receives said packet body data when the input communication unit receives said packet from said one of the mobile stations and the analyzer determines that said one of the mobile stations does not have another packet to transmit, the packet generator generates a packet including said first address, said packet body data, and a polling indication giving said first one of the mobile stations permission to transmit said next packet.

7. The wireless communication apparatus of claim 1, wherein the wireless communication apparatus functions as an access point.

* * * * *